US008882049B2

(12) United States Patent
Shams et al.

(10) Patent No.: US 8,882,049 B2
(45) Date of Patent: Nov. 11, 2014

(54) AIRFOIL SYSTEM FOR CRUISING FLIGHT

(75) Inventors: Qamar A. Shams, Yorktown, VA (US); Tianshu Liu, Portage, MI (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 1309 days.

(21) Appl. No.: 12/138,709

(22) Filed: Jun. 13, 2008

(65) Prior Publication Data

US 2009/0308971 A1 Dec. 17, 2009

Related U.S. Application Data

(60) Provisional application No. 60/943,894, filed on Jun. 14, 2007.

(51) Int. Cl.
*B64C 23/06* (2006.01)
*B64C 9/00* (2006.01)
*B64C 21/10* (2006.01)

(52) U.S. Cl.
CPC ............... *B64C 21/10* (2013.01); *B64C 23/06* (2013.01); *Y02T 50/162* (2013.01); *Y02T 50/166* (2013.01)
USPC ........................ 244/204; 244/203; 244/213

(58) Field of Classification Search
USPC ........... 244/200, 200.1, 201, 203, 204, 204.1, 244/211, 212, 213, 215, 219, 99.8, 199.3, 244/199.1, 198
See application file for complete search history.

(56) References Cited

U.S. PATENT DOCUMENTS

| 4,460,138 | A | | 7/1984 | Sankrithi |
|---|---|---|---|---|
| 4,582,278 | A | | 4/1986 | Ferguson |
| 5,088,665 | A | * | 2/1992 | Vijgen et al. ................. 244/200 |
| 5,335,886 | A | * | 8/1994 | Greenhalgh ................. 244/213 |
| 5,433,404 | A | * | 7/1995 | Ashill et al. ................. 244/200 |
| 5,662,294 | A | * | 9/1997 | Maclean et al. ............ 244/219 |
| 5,752,672 | A | * | 5/1998 | McKillip, Jr. .............. 244/99.8 |
| 6,588,709 | B1 | * | 7/2003 | Dunne et al. ................ 244/201 |
| 6,766,981 | B2 | | 7/2004 | Volk |
| 6,843,452 | B1 | * | 1/2005 | Vassberg et al. ............ 244/203 |
| 6,970,773 | B2 | | 11/2005 | Phillips |
| 7,578,483 | B1 | * | 8/2009 | Cheung et al. ............... 244/203 |
| 2003/0221411 | A1 | * | 12/2003 | Nesbitt et al. ................. 60/204 |
| 2004/0252005 | A1 | * | 12/2004 | Villhard et al. ............... 337/393 |
| 2006/0060720 | A1 | * | 3/2006 | Bogue .......................... 244/200 |
| 2006/0254751 | A1 | | 11/2006 | Sinha |

OTHER PUBLICATIONS

Wikipedia, "NACA airfoil", http://en.wikipedia.org/wiki/NACA_airfoil (6 pgs) [accessed Jun. 11, 2012].*

(Continued)

*Primary Examiner* — Timothy D Collins
*Assistant Examiner* — Richard R Green
(74) *Attorney, Agent, or Firm* — Andrea Z. Warmbier; Helen M. Galus

(57) ABSTRACT

An airfoil system includes an airfoil body and at least one flexible strip. The airfoil body has a top surface and a bottom surface, a chord length, a span, and a maximum thickness. Each flexible strip is attached along at least one edge thereof to either the top or bottom surface of the airfoil body. The flexible strip has a spanwise length that is a function of the airfoil body's span, a chordwise width that is a function of the airfoil body's chord length, and a thickness that is a function of the airfoil body's maximum thickness.

7 Claims, 5 Drawing Sheets

(56) References Cited

OTHER PUBLICATIONS

Tianshu Liu, "Weight Criterion on Flow Control in Level Flight," Journal of Aircraft, Jan.-Feb. 2007, pp. 348-351, vol. 44, No. 1.

Tianshu Liu, et al., "Lift Enhancement by Static Extended Trailing Edge," Journal of Aircraft, Nov.-Dec. 2007, pp. 1939-1947, vol. 44, No. 6.

* cited by examiner

US 8,882,049 B2

AIRFOIL SYSTEM FOR CRUISING FLIGHT

Pursuant to 35 U.S.C. §119, the benefit of priority from provisional application 60/943,894, with a filing date of Jun. 14, 2007, is claimed for this non-provisional application.

ORIGIN OF THE INVENTION

The invention was made by employees of the United States Government and may be manufactured and used by or for the Government of the United States of America for governmental purposes without the payment of any royalties thereon or therefor.

BACKGROUND OF THE INVENTION

1. Field of the Invention

This invention relates to airfoil systems. More specifically, the invention is an airfoil system that improves the aerodynamic efficiency of a winged aircraft operating in the aircraft's cruise flight regime.

2. Description of the Related Art

Airfoil systems utilized by most current-day aircraft include two rigid assemblies. The first rigid assembly is the main body of the airfoil that is attached to an aircraft's fuselage. The second rigid assembly comprises one or more rigid flaps that are movably coupled to the trailing edge of the airfoil's main body. As is well known in the art, these rigid flaps are typically pivoted into the "over the wing" airflow during take-off and landing. However, these airfoil systems are not equipped to optimize "over the wing" airflow for fuel efficiency during an aircraft's cruising operation regime.

SUMMARY OF THE INVENTION

Accordingly, it is an object of the present invention to provide an airfoil system that improves aerodynamic efficiency for an aircraft operating in the cruising regime.

Other objects and advantages of the present invention will become more obvious hereinafter in the specification and drawings.

In accordance with the present invention, an airfoil system includes an airfoil body and at least one flexible strip. The airfoil body has a top surface and a bottom surface, a chord length C, a span S, and a maximum thickness $T_{MAX}$. Each flexible strip is attached along at least one edge thereof to either the top surface or bottom surface of the airfoil body. Each flexible strip has a spanwise length that is approximately $0.5(S)$ to $S$, a chordwise width that is approximately $0.05(C)$ to $0.2(C)$, and a thickness that is approximately $0.01(T_{MAX})$ to $0.05(T_{MAX})$.

DETAILED DESCRIPTION OF THE INVENTION

Figure 1:
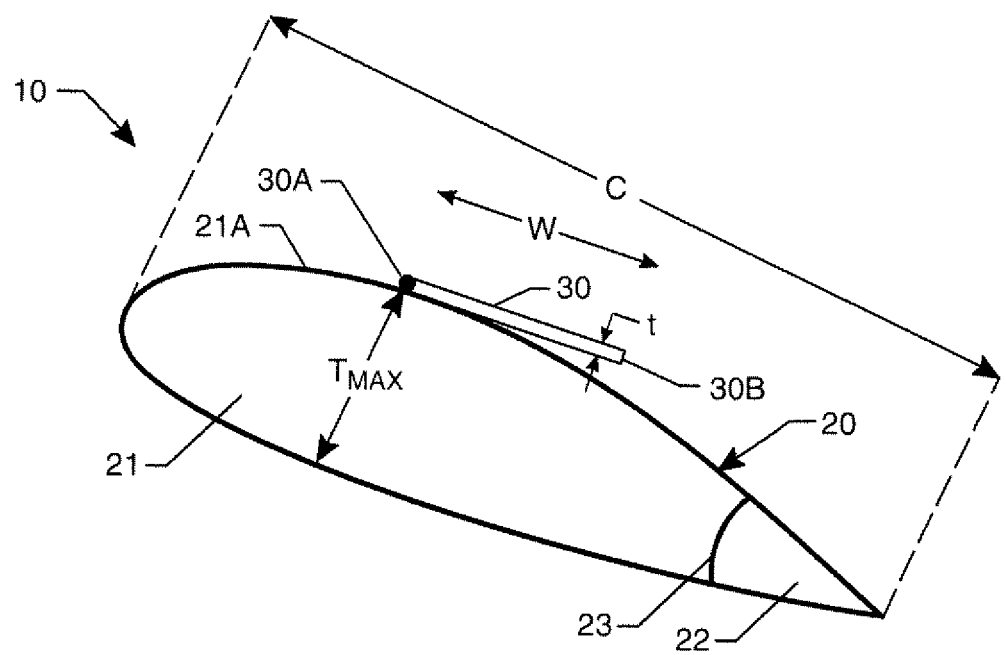
FIG. 1 is a schematic side view of an airfoil system in accordance with an embodiment of the present invention.
Figure 2:
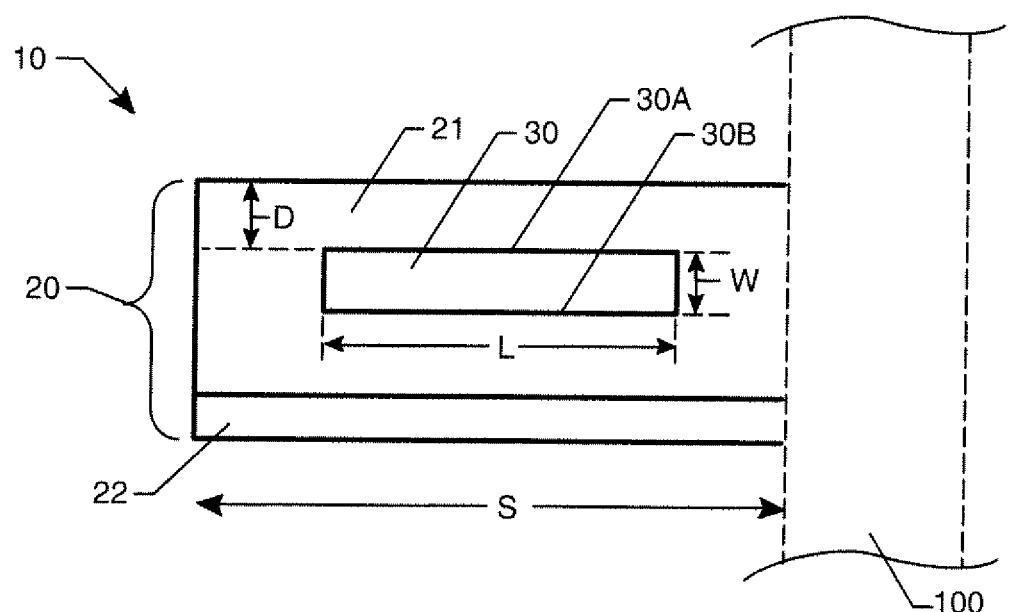
FIG. 2 is a schematic plan view of the airfoil system shown in FIG. 1.

Referring now to the drawings and more particularly to FIGS. 1 and 2, an airfoil system in accordance with an embodiment of the present invention is shown and is referenced generally by numeral 10. Airfoil system 10 will be coupled on one side thereof to the fuselage 100 of an aircraft. The particular type of fuselage is not a limitation of the present invention.

Airfoil system 10 includes a main airfoil body 20 and a flexible element or strip 30. Airfoil body 20 is any conventional airfoil/wing having a rigid main body 21 and a rigid flap (or flaps) 22 coupled to main body 21 such that flap(s) 22 blend into main body 21 while being movable with respect thereto at a point of separation 23. As is well known in the art, flap(s) 22 are moved into the air flowing around airfoil body 20 during take off and landing operations. Coupling/moving mechanisms (not shown) used to create such movement are well understood in the art and are not limitations of the present invention.

Airfoil body 20 has certain well known attributes that are used to constrain flexible strip 30 as will be explained further below. The relevant attributes of airfoil body 20 are its chord length C (i.e., length measured from the leading edge of main body 21 to the trailing edge of flap(s) 22 when flap(s) 22 are in their aligned or neutral position as shown in FIG. 1), span length S (i.e., length measured from fuselage 100 out to the outboard tip of main body 21 as shown in FIG. 2), and the maximum thickness $T_{MAX}$ of main body 21.

Flexible strip 30 is any metal, polymer, composite, etc., constructed in one or multiple layers to have a desired amount of flexibility for a particular application. Accordingly, it is to be understood that the choice of material(s) for flexible strip 30 is not a limitation of the present invention. In general, flexibility of strip 30 can be configured for passive operation and/or active operation. During passive operation, flexible strip 30 undergoes deflection owing solely to an airflow moving around airfoil body 20. During active operation, flexible strip 30 undergoes deflection owing to actuation of one or more actuators (not shown in FIGS. 1 and 2) embedded in flexible strip 30 as will be explained further below. The flexible strip 30 is embedded a wake generated by said airfoil body.

For each of the embodiments disclosed herein, flexible strip 30 has defined length, width, and thickness dimensions that are functions of span length S, chord length C, and maximum thickness $T_{MAX}$, respectively. More specifically, tests of the present invention have shown that the length L of flexible strip 30 (i.e., the strip's spanwise length) should be approximately $0.5(S)$ to $1.0(S)$. The width W of flexible strip 30 (i.e., in the chordwise dimension) should be approximately $0.05(C)$ to $0.2(C)$. The thickness t of flexible strip 30 should be approximately $0.01(T_{MAX})$ to $0.05(T_{MAX})$. Note that the width W and thickness t are exaggerated in the drawings for clarity of illustration.

In the illustrated embodiment of FIGS. 1-2, the leading edge 30A of flexible strip 30 is attached to the top surface 21A of main body 21 only along a line that is located a distance D from the leading edge of airfoil body 20 as best seen in FIG. 2. The distance D is in the range of approximately 0.1(C) to 0.7(C). Positioning flexible strip 30 in this way provides boundary layer separation control when airfoil system 10 is operating in the cruise regime of flight. The sides and trailing edge 30B of flexible strip 30 remain free and unencumbered. To keep the entirety of flexible strip 30 away from flap separation 23 and flap(s) 22, flexible strip 30 can be further constrained in its width W such that the entirety of flexible strip 30 resides in the area defined by top surface 21A of main body 21 as shown in this embodiment.

Figure 3:
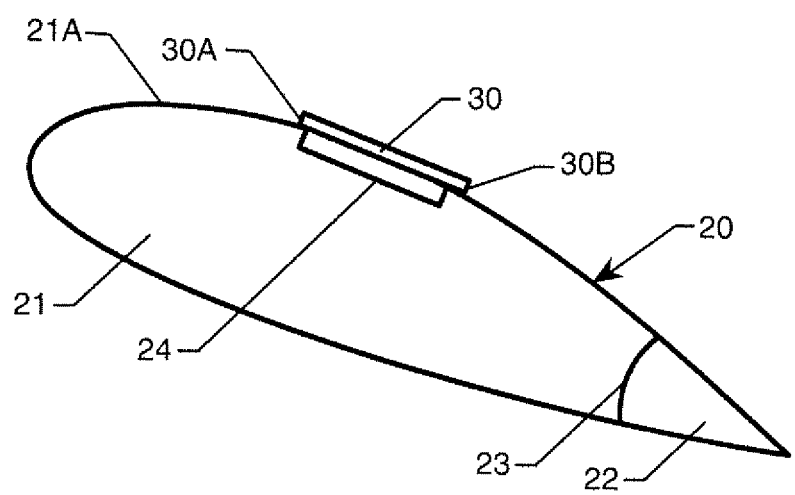
FIG. 3 is a schematic side view of an airfoil system in accordance with another embodiment of the present invention where the flexible strip covers a cavity in the airfoil's body.

Another embodiment of the present invention is illustrated FIG. 3 where a shallow spanwise cavity 24 is formed in top surface 21A of main body 21. Flexible strip 30 is provided over cavity 24 with either just its leading edge 30A attached to top surface 21A, or both its leading edge 30A and trailing edge 30B attached to top surface 21A. Cavity 24 provides controllable deformation of flexible strip 30 below top surface 21A. This embodiment provides control over boundary layer transitions and separation, as well as control over shock waves.

Figure 4:
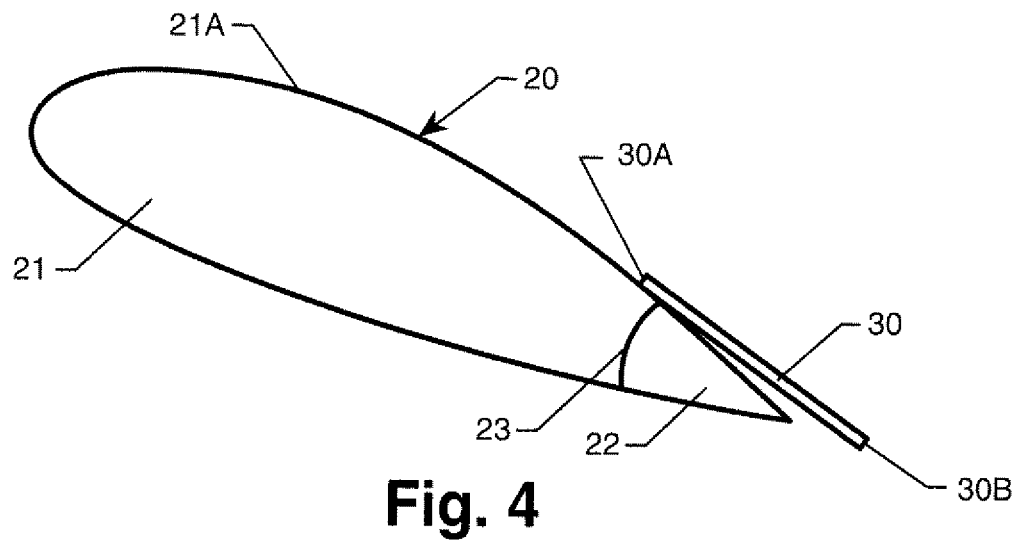
FIG. 4 is a schematic side view of an airfoil system in accordance with another embodiment of the present invention where the flexible strip extends past the trailing edge of the airfoil's rigid portions.
Figure 5:
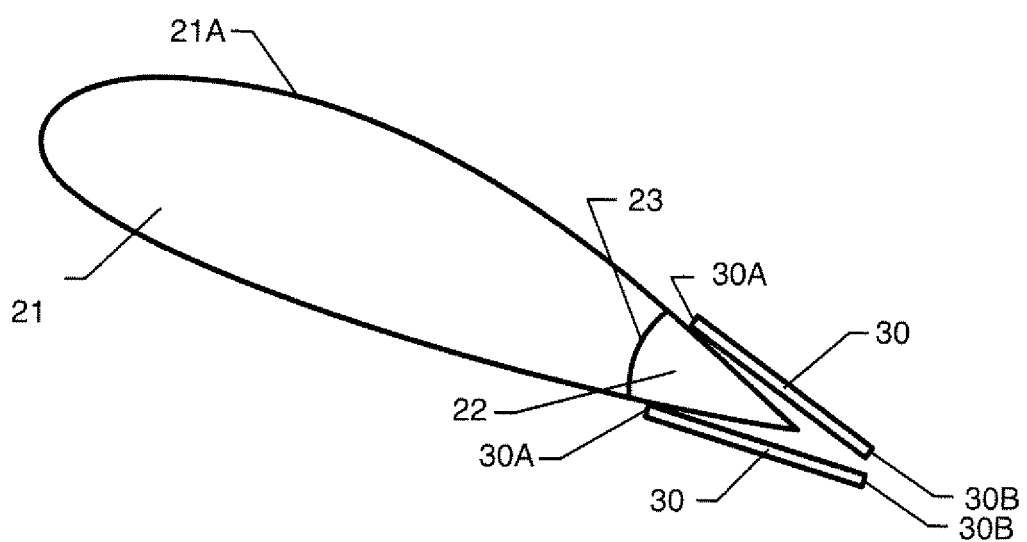
FIG. 5 is a schematic side view of an airfoil system in accordance with still another embodiment of the present invention where flexible strips are attached to the top and bottom surfaces of the airfoil's rigid main body and extend past the trailing edge of the airfoil's rigid portions.

Still other embodiments of the present invention are illustrated in FIGS. 4 and 5 where the flexible strip of the present invention is positioned to optimize flow control when the airfoil system is operating in the cruise regime of flight.

In FIG. 4, a single flexible strip 30 is positioned such that its free and unencumbered trailing edge 30B extends aft of the trailing edge of flap(s) 22. The leading edge 30A of flexible strip 30 can be attached to airfoil body 20 at either main body 21 (as shown in FIG. 4) or flap(s) 22.

In the FIG. 5 embodiment, two flexible strips 30 are used with one being attached to the top surface of airfoil body 20 and the other being attached to the bottom surface of airfoil body 20. The trailing edge 30B of each flexible strip 30 extends aft the trailing edge of flap(s) 22. In this embodiment, the leading edge 30A of one flexible strip 30 is attached to the top surface of flap(s) 22 while the leading edge 30A associated with the other flexible strip 30 is attached to the bottom surface of flap(s) 22.

Figure 6:
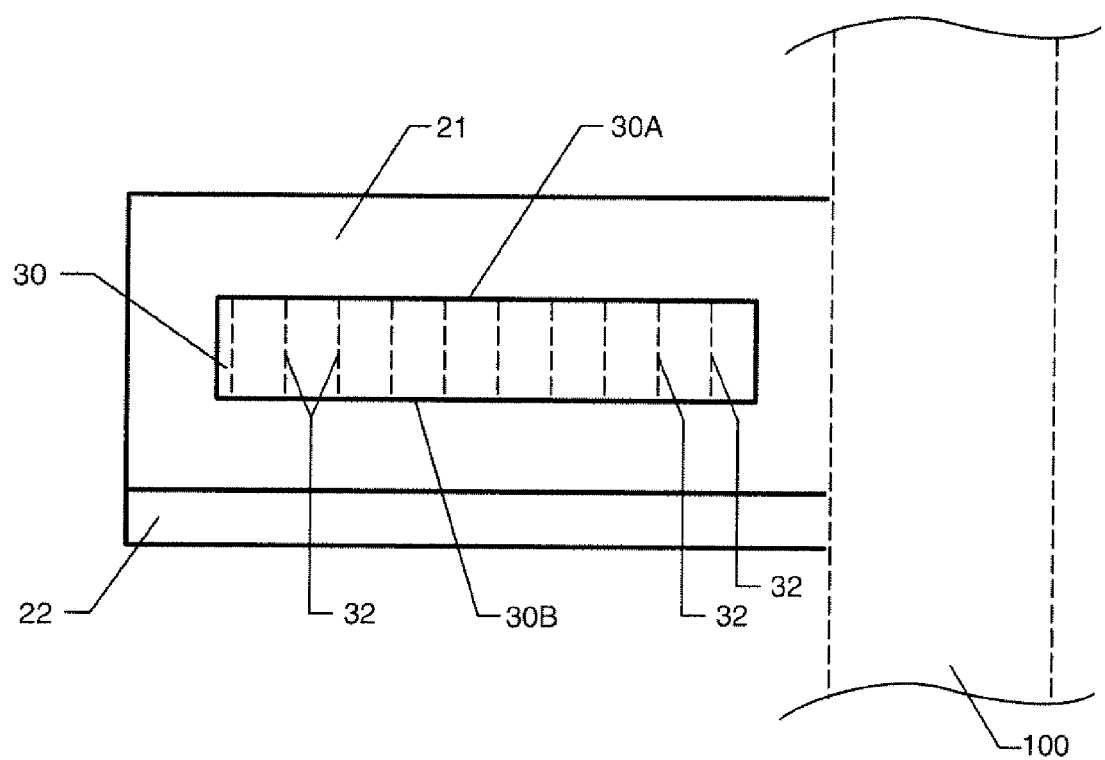
FIG. 6 is a schematic view of an airfoil system incorporating embedded actuators in accordance with another embodiment of the present invention.

As mentioned above, the airfoil system's flexible strip(s) can provide passive and/or active control. In terms of active control, actuators can be coupled to the flexible strip(s). For example, FIG. 6 illustrates an earlier described embodiment of the present invention and further illustrates a number of actuators 32 embedded within flexible strip 30. The embedded nature of actuators 32 is reflected by the use of dashed lines. Actuators 32 can be one or more types of "smart" materials (e.g., shape memory alloys, piezoelectric materials, etc.) that can be actively shaped to thereby control the shape of flexible strip 30. By way of example, actuators 32 can run from the flexible strip's edge 30A to its trailing edge 30B. Actuation of actuators 32 could be provided in accordance with a pre-determined scheme designed for specific cruise operation conditions.

Figure 7:
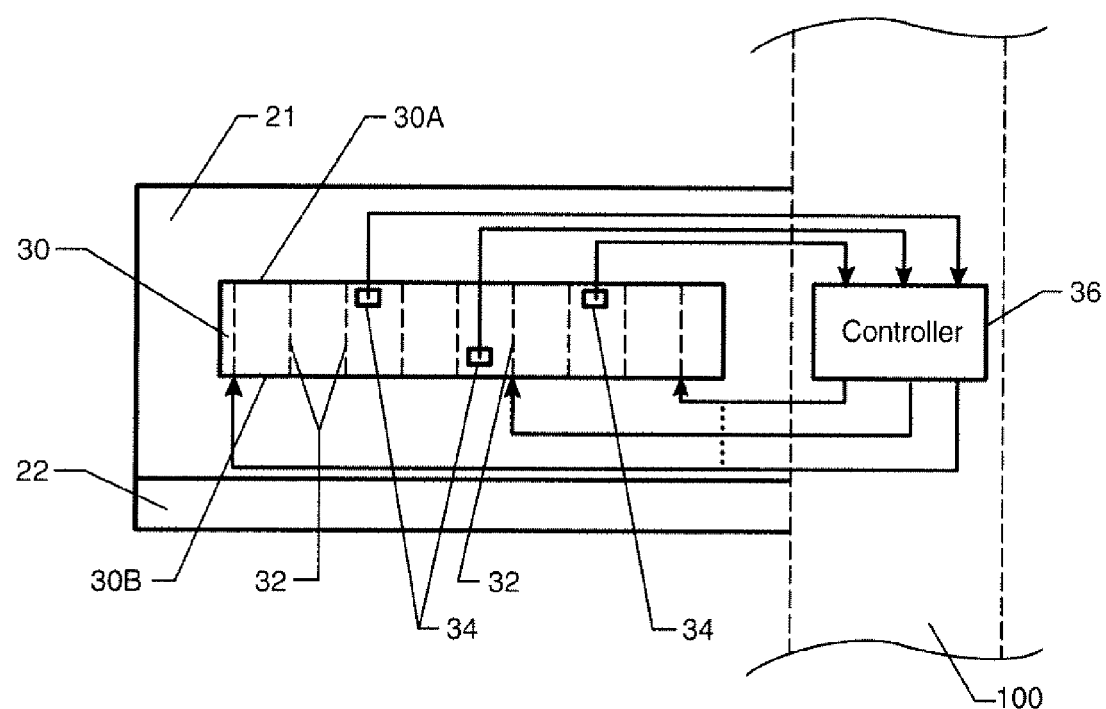
FIG. 7 is a schematic view of an airfoil system incorporating embedded sensors and actuators for active control of the airfoil system in accordance with another embodiment of the present invention.

The present invention could also be implemented as part of an active feedback system as illustrated schematically in FIG. 7. That is, in addition to embedded actuators 32, a plurality of sensors 34 could be embedded within flexible strip 30 to sense one or more conditions (e.g. pressure, humidity, temperature, sound, acceleration, etc.) associated with the airflow moving over top surface of flexible strip 30. The number, type, and positioning of the sensors can be designed for specific applications and, therefore, are not limitations of the invention. The sensor signals can be collected by a controller 36 that processes the sensed-condition signals in order to generate actuation signals for actuators 32.

The advantages of the present invention are numerous. The use of one or more specifically-constrained flexible strips will improve the aerodynamic efficiency of a conventional airfoil operating in cruise flight. Since the flexible strip is minimally invasive, it will not significantly impact take-off or landing aerodynamics. The flexible strips are simple elements that can be used passively or actively.

Although the invention has been described relative to a specific embodiment thereof, there are numerous variations and modifications that will be readily apparent to those skilled in the art in light of the above teachings. It is therefore to be understood that, within the scope of the appended claims, the invention may be practiced other than as specifically described.

What is claimed as new and desired to be secured by Letters Patent of the United States is:

1. An airfoil system, comprising;
   an airfoil body having a flap coupled to a main body at a flap separation, wherein said main body comprises a top surface and a bottom surface, and said airfoil having a chord length C, a span S, and a maximum thickness $T_{MAX}$;
   a flexible strip comprising at least one edge and having a spanwise length that is approximately 0.5S to 1.0S, a chordwise width that is approximately 0.05C to 0.2C, and a thickness that is approximately $0.01T_{MAX}$ to $0.05T_{MAX}$;
   wherein said flexible strip is attached to said top surface along said at least one edge thereof at a line aft of said leading edge of said airfoil body;
   wherein said line is located a distance from said leading edge that is approximately 0.1C to 0.7C such that the flexible strip does not extend beyond the flap separation;
   wherein said flexible strip is configured to provide boundary layer separation control when said airfoil system is operating in a cruise regime of flight; and
   wherein said flexible strip is configured to be embedded in a wake generated by said airfoil body.

2. The airfoil system as in claim 1, further comprising at least one actuator embedded within said flexible strip.

3. The airfoil system as in claim 1, further comprising:
   at least one sensor embedded within said flexible strip for sensing at least one condition at a surface thereof and for generating a signal indicative of each said condition;
   at least one actuator embedded within said flexible strip; and
   means coupled to said at least one sensor and said at least one actuator for controlling each said actuator based on each said signal generated at said flexible strip.

4. The airfoil system as in claim 1, further comprising a second flexible strip coupled to said bottom surface of said airfoil body near a trailing edge thereof and extends aft of said trailing edge to terminate in an unencumbered edge.

5. The airfoil system as in claim 4, further comprising at least one actuator embedded within each said flexible strips.

6. The airfoil system as in claim 4, further comprising:
   at least one sensor embedded within each said flexible strips for sensing at least one condition at corresponding surfaces thereof and for generating a signal indicative of each said condition;
   at least one actuator embedded within each said flexible strips; and
   means coupled to said at least one sensor and said at least one actuator for controlling each said actuator based on each said signal.

7. The airfoil system as in claim 1, wherein said flexible strip is a polymer.

* * * * *